April 9, 1935. G. H. CONNORS 1,997,104
LIFTING MECHANISM FOR DUMP BODIES OF VEHICLES
Filed Nov. 1, 1932 4 Sheets-Sheet 1
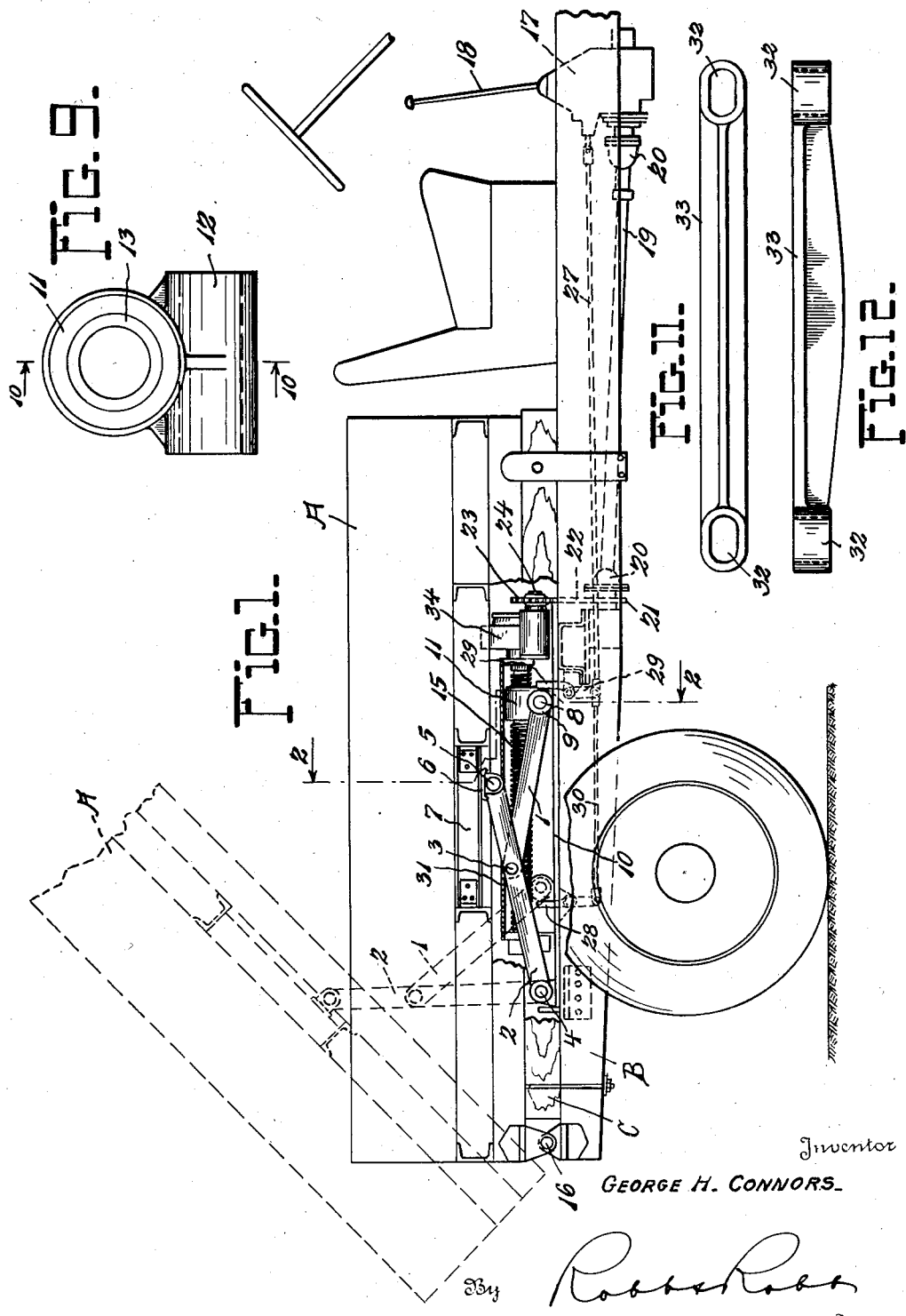
Inventor
GEORGE H. CONNORS
By Robt & Robt
Attorneys

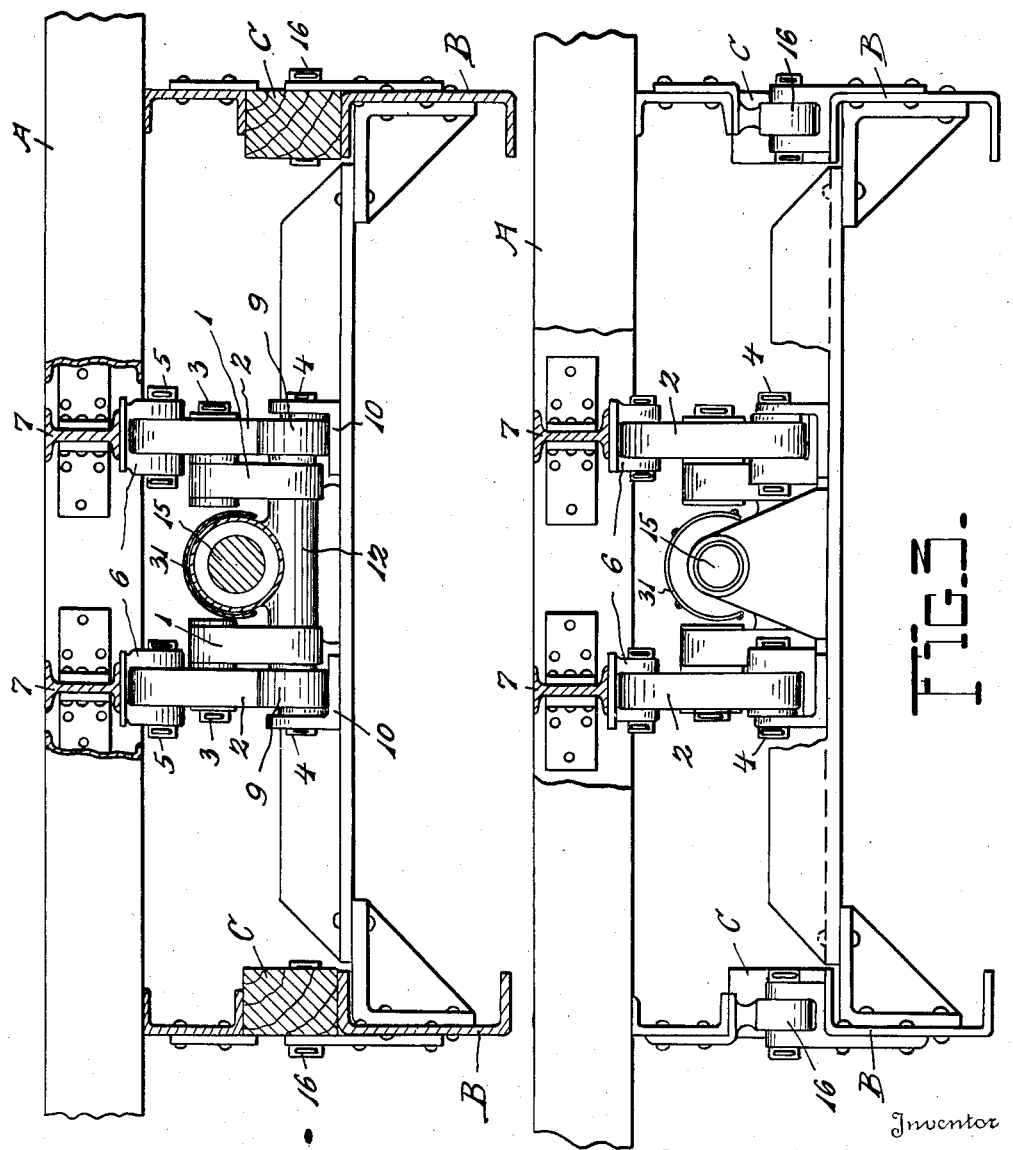

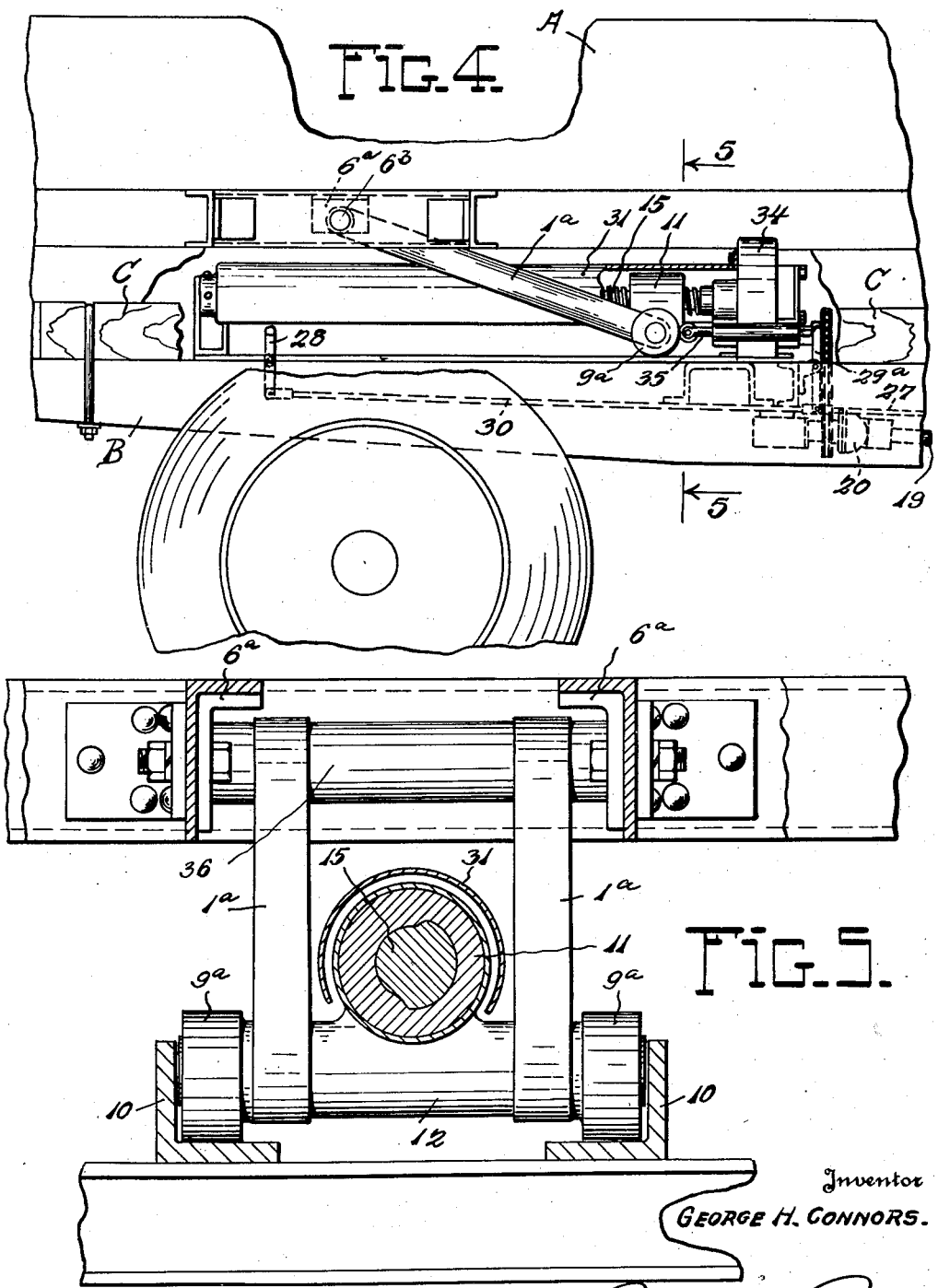

April 9, 1935. G. H. CONNORS 1,997,104
LIFTING MECHANISM FOR DUMP BODIES OF VEHICLES
Filed Nov. 1, 1932 4 Sheets-Sheet 4
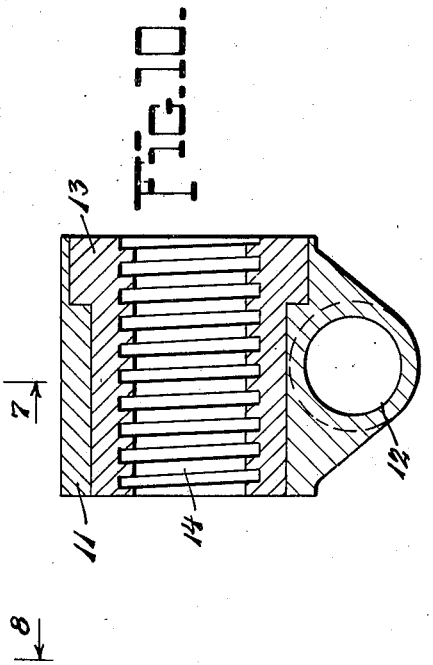
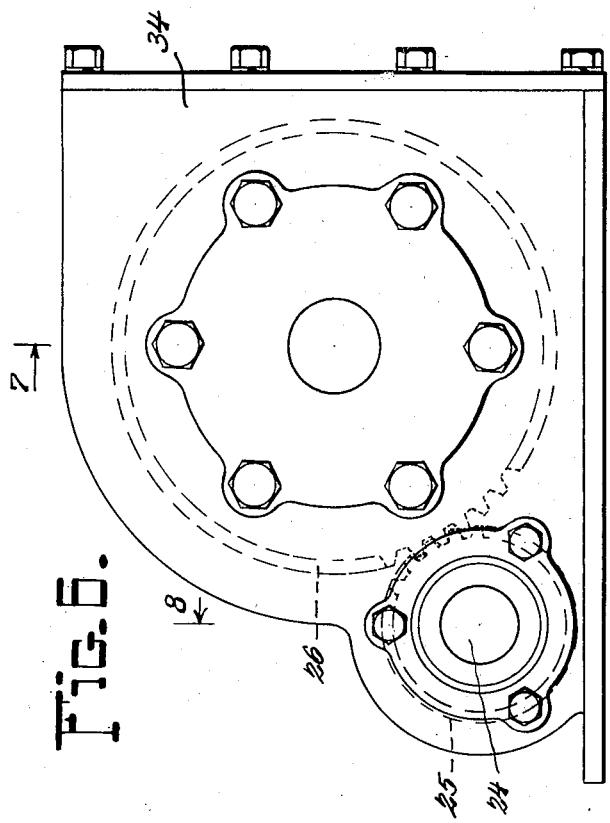
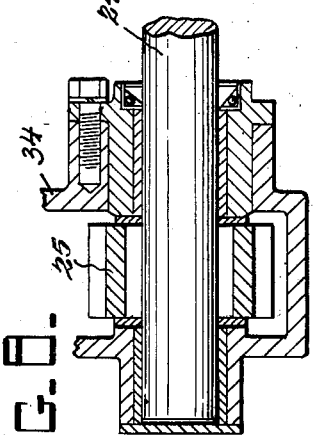
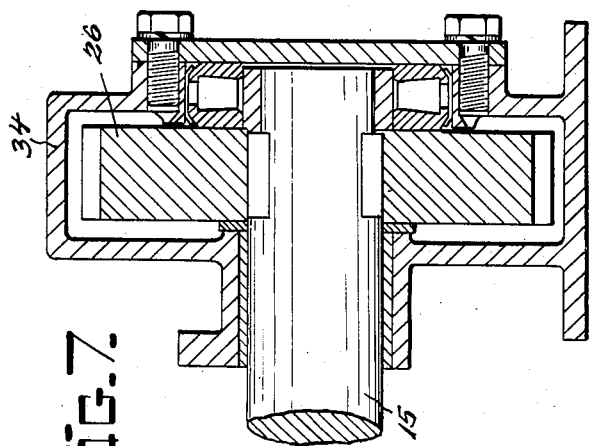
Inventor
GEORGE H. CONNORS.
By Robb & Robb
Attorneys Patented Apr. 9, 1935

1,997,104

UNITED STATES PATENT OFFICE 1,997,104

LIFTING MECHANISM FOR DUMP BODIES OF VEHICLES

George H. Connors, Edgerton, Wis., assignor to Highway Trailer Company, Edgerton, Wis., a corporation Application November 1, 1932, Serial No. 640,721

3 Claims (Cl. 298—21)

The mechanism of the present invention provides substantial improvements in lifting instrumentalities for the bodies of dump vehicles, such as trucks from which sand, gravel or the like is to be dumped and distributed on a roadway, or for the so-called "transit-mixers" for mixing concrete in road building operations, or in general, for any purpose where the vehicle body is to be elevated and tilted to discharge the contents thereof.

One feature of the present invention lies in the provision of power transmitting instrumentalities for the lifting mechanism and operable from the source of power of the vehicle, which power transmitting instrumentalities are separate and distinct from the power transmission for driving the vehicle, mechanism being provided for automatically rendering inoperative the said power transmitting instrumentalities when the vehicle body has reached its maximum elevation for dumping purposes, and also when the body has fully returned to horizontal, or charging, position.

Operating means for the said power transmitting instrumentalities are also provided, whereby the body may be lifted to any position intermediate its extreme positions and held in the intermediate position as long as may be desired, this being a desirable feature when spreading gravel or other materials.

The present construction also embraces a new and highly simplified lifting mechanism operated by the aforesaid power transmitting instrumentalities, the lifting mechanism including a simplified force transmitting system operated by the rotation of a screw driven by the said power transmitting instrumentalities.

The structural details of the improved mechanism will be described in detail hereinafter, it being understood, of course, that various details of the construction may be modified without departing from the spirit of the invention, and that the specific forms of the construction shown in the accompanying drawings are to be regarded only as illustrative of convenient details of the construction.

In the drawings:—

Figure 1 represents a side elevation of a vehicle provided with a dump body actuated by the mechanism of the present invention, parts of the vehicle being broken away to more clearly show certain details of the improved construction.

Figure 2 is a vertical sectional view through the body and lifting mechanism, the view being taken on the line 2—2 of Figure 1, looking in the direction of the arrows.

Figure 3 is a rear view of the lifting mechanism, the body being shown fragmentarily.

Figure 4 is a fragmentary side elevation, similar in general to Figure 1, but showing a somewhat modified form of lifting mechanism for the body.

Figure 5 is a vertical sectional view, taken on the line 5—5 of Figure 4.

Figure 6 is a side elevation of a housing containing reduction gearing for actuating the lifting instrumentalities, the gearing being indicated fragmentarily in dotted lines.

Figure 7 is a vertical section through the housing of Figure 6, taken on the line 7—7 of Figure 6, looking in the direction of the arrows.

Figure 8 is another vertical section through the housing of Figure 6, taken on the line 8—8 of Figure 6, looking in the direction of the arrows.

Figure 9 is an end view of a nut and nut housing operating on the aforesaid screw, and serving as the direct actuating member for the lifting members.

Figure 10 is a vertical section through the nut housing taken on the line 10—10 of Figure 9, looking in the direction of the arrows.

Figure 11 is a bottom view of one form of member designed for maximum strength and minimum weight.

Figure 12 is a side view of the member of Figure 11.

Referring more particularly to the drawings, A represents a vehicular dump body which may be of any kind, such as, for example, a transit mixer for concrete, or any form of body, but illustrated as a usual dump body for a truck, which is mounted upon a vehicle chassis B, and shown as resting, when in charging position, upon wooden sills C. In Figure 1 the wooden sills and longitudinal frame member are illustrated as being cut away to better show the hoist or lift mechanism.

This mechanism is duplicated on each side of the machine, and hence only one side needs to be described. The mechanism is shown as comprising a lever 2 and a force applying member 1 which may take the form of a link pivotally interconnected at 3, this interconnection being intermediate the ends of the lever 2.

One end of the lever 2 is pivotally anchored at the bearing 4, the other end being pivoted at 5 to skid 6, operating against the skid rails 7 during actuation of the body A, as will become apparent hereinafter.

One end of the member 1 is connected to the lever 2 at 3, as has been described. The other end of member 1 is pivotally mounted on a shaft 8, said shaft carrying rollers 9 which run on rails 10, as will be described also in more detail hereinafter.

This shaft 8, as will be apparent from the drawings, extends through the nut housing 11 from side to side, operating in the bearing 12, which forms a housing for the shaft 8, this bearing being an integral part of the nut housing 11.

The nut housing 11 is secured around the nut 13, which is internally threaded at 14 to travel along the threads of the screw shaft 15 when this screw shaft is suitably rotated. Upon such rotation, therefore, the housing 11 travels along the screw shaft in a direction depending upon the direction of rotation of the screw, with corresponding actuation of the members 1 and 2. When the housing 11 and nut 13 move rearwardly of the vehicle, the rollers 9 move along the rails 10 to lift the pivotal connection 3 between the members 1 and 2. Since lever 2 is pivotally anchored at bearing 4, lifting of the connection 3 will lift the skid 6 against rail 7, thus lifting the body A around the hinge 16, until the parts assume the dotted line positions of Figure 1. Reversal of direction of rotation of the screw 15 returns the parts to their original position.

The mechanism for driving the screw will be next described.

In the housing 17 are located power transmission gearing driven from the source of power of the vehicle, but forming a distinct unit from the transmission for driving the vehicle. This gearing is not shown, being the standard gearing for rotation in opposite direction, operable by suitable manipulation of lever 18 in well known manner. Power from this gearing is taken off by means of shaft 19 provided with universal joints 20, by means of which a sprocket 21 is driven. By means of a chain 22, sprocket 21 drives sprocket 23 mounted on shaft 24 to which shaft is keyed the reduction pinion 25, which meshes with gear 26, keyed or otherwise suitably secured to the screw shaft 15. Therefore, by suitable manipulation of lever 18, the screw 15 may be rotated so as either to advance or retract the nut housing 11, to correspondingly lift or lower the vehicle body.

Since, however, it is desirable to interrupt the rotation of the screw 15 at the times when the body is raised to its maximum dumping position and restored to its horizontal loading position, provision is made for automatically shifting the aforesaid power transmission gearing to neutral position, responsively to the assumption by the body of the discharging and loading positions, in this way assuring proper power cut-off without relying upon manual manipulation of the gears for this purpose.

To this end, there is provided a rod 27 which is actuated initially by lever 18, and which carries the trip levers 28 and 29; or, more exactly, the trip levers 28 and 29 are interconnected by a second rod 30, as will be apparent from Figure 1. The rollers 9 operate along the tops of the rails between these trip levers and actuate these levers by engagement therewith at such times as the truck body is raised to its maximum dumping position and is returned to its horizontal loading position, thereby at such times shifting the power transmission gearing in housing 17 into neutral, through actuation of rods 30 and 27, thereby interrupting, automatically, the power transmission to the screw 15.

This action will be clearly understood by a consideration of the following explanation.

Assume the vehicle body is loaded and ready to be lifted to dumping position. The screw 15 is inoperative; that is, the gearing in housing 17 is in neutral position. Now to actuate the screw 15 in order to lift the vehicle body, lever 18 is manipulated to shift the gears so that screw 15 will rotate in one direction according to whether screw threads are right or left hand threads. This shifting of the gears operates rods 27 and 30 to incline the trip levers toward the front of the vehicle.

Now, as housing 11 moves along the threads of the screw 15, member 1, carried thereby, is raised to lift lever 2 to elevate the body, rollers 9 facilitating the action by reducing friction, these rollers traveling on the rails 10 until they reach the dotted line position in Figure 1. The rollers 9 then engage the inclined lever 28 and press lever 28 into a substantially upright position, thereby pushing upon rods 30 and 27, automatically shifting the gears into neutral and stopping the rotation of screw 15 as the body A assumes its dumping position.

To return the body A to loading position, lever 18 is manually operated to shift the gears from neutral into reverse, when screw 15 will be driven in opposite direction to retract the housing 11 and lower the lever system. This shifting of the gears into reverse inclines the trip levers towards the rear of the vehicle, whereby lever 29 is tripped by rollers 9 as the body returns to horizontal position, thereby again automatically shifting the gears into neutral position and stopping the rotation of the screw 15.

Should it be desired to stop the movement of the body at any point intermediate its extreme positions, this may be accomplished by manually shifting the lever 18 to bring the gears into neutral. The invention therefore provides both an automatic and a manual control for the body actuating mechanism.

To prevent dirt and the like from working into the screw 15, there is provided a shield 31, which substantially encloses the screw 15.

While the levers 1 and 2 may be of any shape, that shown in Figures 11 and 12 may be mentioned as combining strength and rigidity with comparative lightness in weight. The levers are shown as provided with bearings 32 at each end of the arm 33.

The pinion 25 and gear 26 are contained in the housing 34.

The modification shown in Figures 4 and 5 is very similar to the construction just described, with the exception that the levers 1 and 2 have been replaced by a single arm 1a, and the housing 34 has been extended to include the slidably mounted rod 35 which engages the trip lever 29a under pressure of the roller 9a as the vehicle body is returned to horizontal position, thereby shifting the gears to neutral, as already has been described.

In the modification of Figures 4 and 5, the links 1a may be interconnected by the bar 36, which carries the skids 6. In this form, the links 1a are fixedly pivoted to the brackets 6a at the points 6b, the brackets 6a being shown as bolted in position in Figure 5.

In the first mentioned construction the skids 6 may be replaced by rollers, if desired.

Having thus described my invention, what I claim as new and desire to secure by Letters Patent of the United States, is—

1. Lifting mechanism for vehicle bodies comprising, in combination, lifting members for the body, actuating mechanism for the said members including a rotatable screw shaft, a housing mounted on the shaft for travel therealong and pivotally connected with the said members, roller means at said pivotal connection, guide tracks therebeneath for relieving the screw of downward thrusts on said members and for guiding the pivotal connection in a substantially horizontal path longitudinally of the vehicle incident to operation of the screw shaft, the said members being arranged to exert upwardly directed forces against the said body to lift the said body as the housing travels in one direction along the said screw shaft and to lower the said body to horizontal position upon rotation of the shaft in the opposite direction, power transmitting instrumentalities for driving the said screw shaft comprising transmission gearing, a power transmission shaft actuated from the said gearing; power take-off means for taking power from the said transmission shaft to the said screw shaft for driving the said screw shaft, and means for automatically rendering inoperative the power transmitting mechanism when the body is raised to dumping position and when returned to loading position, the said means comprising gear shifting rods and trip levers for actuating the said rods, said trip levers being mounted in the path of one of said rollers whereby upon movement of the said lifting members through a predetermined distance, the roller means will engage the said trip levers to actuate the gear shifting rods for shifting the transmission gearing into neutral position.

2. Lifting mechanism for vehicle bodies comprising, in combination interconnected lifting members, one of the said members comprising levers being pivotally anchored at one end to the usual frame of the vehicle, the other end of the lever being in slidable engagement with the body of the vehicle, the other of said members comprising a link interconnected to the aforesaid lever and adapted to move the aforesaid lever upon movement of the link longitudinally of the vehicle frame, actuating means for the said link including a rotatably mounted threaded shaft, a housing threadedly mounted on the said shaft for movement therealong responsive to rotation of the shaft, the said housing being operatively interconnected to the said link for movement thereof with the said housing, and power transmitting mechanism for operating the said screw shaft comprising shiftable transmission gearing, a transmission shaft operable by the said gearing, gear shifting rods and trip levers on the said rods for actuating the same upon movement of the said link through a predetermined distance for engagement of the said link with the trip levers, thereby actuating the said rods to automatically shift the said gearing into neutral position responsively to movements of the vehicle body to dumping and charging positions to thereby interrupt the transmission of power to the said screw shaft when the vehicle body has assumed dumping and charging positions respectively, and manually operable gear shifting instrumentalities for operating the gearing for lifting and lowering the said body and for shifting the said gearing to its neutral position to hold the said body in any predetermined position between the extreme positions of dumping and loading.

3. In combination with a vehicle having a dump body thereon adapted to be tilted to elevate one end thereof for the purpose of dumping the body, an apparatus for raising and lowering said dump body which comprises a thrust member pivotally connected to the dump body at one end and being free to move with respect to the frame of the vehicle at the other end, rollers associated with said other end, said rollers riding on the frame of said vehicle, actuating means for said thrust member including a rotatably mounted threaded shaft, a housing threadedly mounted on said shaft for movement therealong responsive to rotation of the shaft, the said housing being operatively interconnected to the thrust member for movement with said housing, power transmitting mechanism for operating the said screw shaft, comprising shiftable transmission gearing, a transmission shaft operable by the said gearing, gear shifting rods, and trip levers on the said rods for actuating the same upon movement of the said thrust member to bring said rollers into engagement with the said trip lever, thereby actuating the said rods to automatically shift the said gearing into neutral position responsively to movements of the vehicle body to dumping and charging positions to thereby interrupt the transmission of power to the said screw shaft when the vehicle body has assumed dumping and charging positions respectively, and manually operable gear shifting instrumentalities for operating the gearing for lifting and lowering the said body and for shifting the said gearing to its neutral position to hold the said body in any predetermined position between the extreme positions of dumping and loading.

GEORGE H. CONNORS.